(12) United States Patent
Junghanns et al.

(10) Patent No.: US 8,130,683 B2
(45) Date of Patent: Mar. 6, 2012

(54) ESTABLISHMENT OF A TRANSCODER-FREE OPERATION CONNECTION

(75) Inventors: Steffen Junghanns, Langenau (DE); Stefan Oestreich, Holzkirchen (DE); Claudia Vallentin, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 412 days.

(21) Appl. No.: 10/579,407

(22) PCT Filed: Apr. 18, 2005

(86) PCT No.: PCT/EP2005/051687
§ 371 (c)(1),
(2), (4) Date: May 15, 2006

(87) PCT Pub. No.: WO2005/104583
PCT Pub. Date: Nov. 3, 2005

(65) Prior Publication Data
US 2007/0135165 A1 Jun. 14, 2007

(30) Foreign Application Priority Data
Apr. 23, 2004 (DE) .......................... 10 2004 019 987

(51) Int. Cl.
*H04B 7/00* (2006.01)
(52) U.S. Cl. ... 370/310; 370/254; 370/255; 370/395.64; 370/522; 455/432.2; 455/466
(58) Field of Classification Search .................. 370/310, 370/254, 255, 395.64, 522; 455/432.2, 455
See application file for complete search history.

(56) References Cited

U.S. PATENT DOCUMENTS

| 7,577,152 | B2* | 8/2009 | Bachmann et al. ...... 370/395.64 |
| 2002/0077065 | A1 | 6/2002 | Tamura et al. |
| 2003/0195981 | A1* | 10/2003 | Graf et al. ..................... 709/238 |
| 2003/0210659 | A1 | 11/2003 | Chu et al. |
| 2004/0100914 | A1* | 5/2004 | Hellwig et al. ............... 370/254 |

(Continued)

FOREIGN PATENT DOCUMENTS
DE 199 11 179 C1 11/2000
(Continued)

OTHER PUBLICATIONS

Ante Burilovic, Alen Bulic and Branko Mikac□□Introduction of Transcoder Free Operation into Core Network□□Jun. 11-13, 2003□□7th International Conference on Telecommunications—ConTEL 2003□□pp. 713-716.*

(Continued)

*Primary Examiner* — Kamran Afshar
*Assistant Examiner* — Kathy Wang-Hurst
(74) *Attorney, Agent, or Firm* — Staas & Halsey LLP

(57) ABSTRACT

When a request is sent by a switching unit, relating to the use of at least one subset of a codec mode configuration for the establishment of a transcoder-free operation connection by a radio network controller, it is checked whether the at least one requested subset is supported by the radio network controller. If the at least one subset of at least one codec mode configuration is supported, a transcoder-free operation connection to the switching unit and to the communication terminal is established by the radio network controller. Furthermore, a message relating to the at least one subset of the codec mode configuration to be used is signalled from the radio network controller to the communication terminal for the transmission of data.

16 Claims, 1 Drawing Sheet

U.S. PATENT DOCUMENTS

2007/0171841 A1* 7/2007 Witzel et al. .................. 370/254

FOREIGN PATENT DOCUMENTS

| DE | 101 63 478 A1 | 7/2003 |
| WO | 03/092312 A1 | 11/2003 |
| WO | 03/103313 A1 | 12/2003 |
| WO | 2004/028093 A1 | 4/2004 |

OTHER PUBLICATIONS

Tae-Gyu Kang et al, "SIP/SDP Signaling of Media Gateway with Transcoding Function in Converged Network"; Advanced Communication Technology, 2004, The 6th Int'l Conference, Feb. 9-11, 2004, pp. 842-845.

"Universal Mobile Telecommunications System (UMTS); Transcoder Free Operation (3GPP TR 25.953 version 4.0.0 Release 4); ETSI TR 125 953"; ETSI Standards, European Telecommunications Standards Institute, vol. 3, R3, No. V400, Mar. 2001, pp. 9-10.

International Search Report for International Application No. PCT/EP2005/051687; mailed Jul. 1, 2005.

"Universal Mobile Telecommunications System (UMTS); Out of Band Transcoder Control; Stage 2 (3GPP TS 23.153 version 4.5.0 Release 4); ETSI TS 123 153", ETSI Standards, European Telecommunications Standards Institute, Sep. 2002.

* cited by examiner

US 8,130,683 B2

ESTABLISHMENT OF A TRANSCODER-FREE OPERATION CONNECTION

CROSS REFERENCE TO RELATED APPLICATIONS

This application is based on and hereby claims priority to German Application No. 10 2004 019 987.6 filed on Apr. 23, 2004, the contents of which are hereby incorporated by reference.

BACKGROUND OF THE INVENTION

1. Field of the Invention

The invention relates to a method and device for establishing a transcoder-free operation connection (TrFO) between two communication terminals (MS) in a communication network.

2. Description of the Related Art

In order to use transcoder-free operations (TrFO), a common codec type or in the case of a multi-rate codec type a common set or common configuration of codec modes has to be negotiated between the network units (UEs, RNCs, MSCs) involved. To this end, a switching unit (MSC) has access to a storage unit containing information about the radio network controller (RNC). The storage unit for example contains an input specifying the codec modes supported by the access network (UTRAN) or the radio network controller (RNC). This storage unit is downloaded by the operator for each O&M (operation and maintenance) device and contains a list of the codec modes.

However the access network UTRAN with radio network controllers RNC only supports quite specific combinations of codec modes. It would be too complex to support all codec modes in all combinations and would take up a large number of resources. The information required to negotiate the codec mode to be used for the transcoder-free operation is exchanged between the communication terminals (MSs) and switching units (MSCs) at the Iu interface by NAS signaling or at the Nc interface by BICC signaling.

According to the content of the storage unit, a radio network controller RNC 1 for example supports the codec modes a, b, c, d, f in the combinations (codec mode configuration) a/b and b/c/d/f. The supported codec mode configurations have to be taken into account when negotiating the codec modes. Currently only individual codec modes are negotiated, not codec mode configurations, which each includes a number of codec modes. This means that it is sometimes not possible to establish a TrFO connection, as with the plurality of possible codec mode configurations (15 codec mode configurations are currently defined), it is very probable that the two radio network controllers RNCs involved in negotiating a TrFO connection support an overlapping number of identical modes but only in different codec mode configurations. If the radio network controller RNC2 supports the code mode configurations "a/b/c" and "f/g/h" for example, it is currently not possible to establish a transcoder-free operation connection between the radio network controller RNC1, which supports a/b and b/c/d/f, and the radio network controller RNC2.

SUMMARY OF THE INVENTION

An aspect of the present invention is therefore to provide a simple and effective way of increasing the probability that a transcoder-free operation connection can be established between two communication terminals.

In the event of a request from a switching unit relating to the use of at least one subset of a codec mode configuration for the establishment of a transcoder-free operation connection, a radio network controller, which supports all the subsets of a supported codec mode configuration, checks whether the at least one requested subset is supported. Such a subset includes at least one, preferably at least two codec modes of a codec mode configuration but fewer than all the codec modes of the codec mode configuration. A transcoder-free operation connection is then established, if the result of the check is that at least this one subset is supported. To ensure compatibility with the Iu interface, the radio network controller signals to the communication terminal using a suitable message that data should only be sent in the uplink direction (from the communication terminal to the radio network controller) with the at least one supported subset of a codec mode configuration, as requested by the switching unit. One advantage of the invention is that the probability of a transcoder-free operation connection being set up between two communication terminals can be increased significantly in a simple and effective manner.

BRIEF DESCRIPTION OF THE DRAWINGS

These and other objects and advantages of the present invention will become more apparent and more readily appreciated from the following description of an exemplary embodiment illustrated in a figure, taken in conjunction with the accompanying drawings of which.

DETAILED DESCRIPTION OF THE PREFERRED EMBODIMENT

Figure 1:
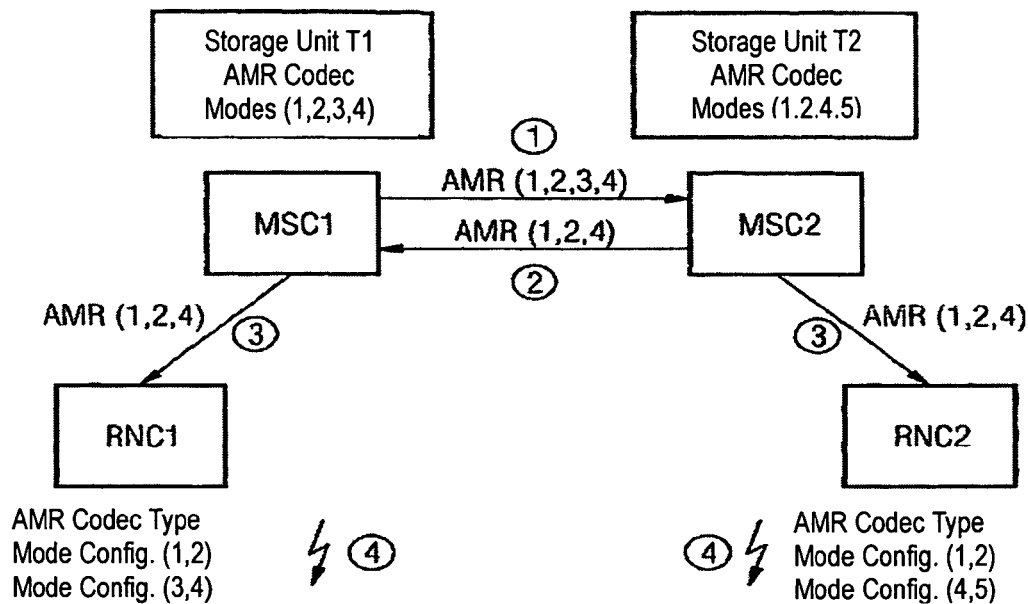
FIG. 1 is a block diagram of a simplified network architecture for the known negotiation of a codec mode for a connection between two communication terminals.

Reference will now be made in detail to the preferred embodiments of the present invention, examples of which are illustrated in the accompanying drawings, wherein like reference numerals refer to like elements throughout.

FIG. 1 shows a simplified network architecture for negotiating a codec mode for a connection between two communication terminals UE in for example a cellular mobile radio network, such as the UMTS network. The radio network controller RNC1 supports two different codec mode configurations (mode 1, 2 and mode 3, 4). In contrast all AMR modes 1 to 4 are input in the RNC1 storage unit T1 of the controlling switching unit MSC1. The codec mode configurations supported by the radio network controller RNC1 are not taken into account. The second radio network controller RNC2 also supports two different codec mode configurations (mode 1, 2 and mode 4, 5). In the RNC2 storage unit T2 of the second switching unit MSC2 the codec mode configurations in the radio network controller RNC2 are in turn not taken into account. All AMR modes 1 to 5 are again input in the RNC2 storage unit T2. For codec negotiation the sending (originating) side with the switching unit MSC1, the RNC1 storage unit T1 and the radio network controller RNC1 transmits all supported codec types and modes, for example in the form of a list, table, etc., to the receiving (terminating) side with the switching unit MSC2, the RNC2 storage unit T2 and the radio network controller RNC2 (1). On the receiving side this list, table, etc. of supported codec types and modes is reduced by the types and modes that are not supported on the receiving side, one codec mode is selected with one codec mode configuration and sent back to the sending side (2). RAB (Radio Access Bearer) assignment is now initiated with the selected codec mode in the direction of the radio network controller RNC1 (3). As the radio network controllers RNC1 and RNC2 do not however support the selected codec mode configuration (1, 2, 4), the RAB assignment is rejected (4). A connection with a transcoder-free operation cannot therefore be set up between two communication terminals UE, for example mobile radio terminals, mobile computers, mobile organizers, etc.

Figure 2:
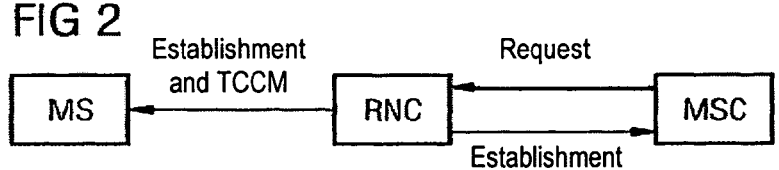
FIG. 2 is a block diagram of a simplified network architecture for method according to an aspect of the invention.

FIG. 2 shows a method according to an aspect of the invention in a communication network, preferably a cellular mobile radio network. If a radio network controller RNC receives a request relating to the use of a subset (for example a/b) of a codec mode configuration (for example a/b/c) for the establishment of a transcoder-free operation connection between two communication terminals, MS, it (RNC) checks whether the requested subset a/b is supported. The request can be sent in the form of a RAB (Radio Access Bearer) request from the switching unit MSC to the radio network controller RNC. If the requested subset is supported by the radio network controller RNC, a connection, e.g. a RAB (Radio Access Bearer) connection, is established to the switching unit MSC using the requested subset a/b of a codec mode configuration. A connection is established to an air interface or to the communication terminal MS from the radio network controller RNC using the codec mode configuration a/b/c, as the radio network controller has only stored all the necessary data (e.g. transport formats, SIR targets, etc.) for the codec mode configuration. However to ensure compatibility with the Iu interface, on which mode c is not permitted, the radio network controller RNC uses a signaling message, for example a Transport Combination Control Message TCCM, a radio resource control signaling, etc., to restrict the codec mode configuration to a permitted subset a/b negotiated with the switching unit. The signaling message or messages can also be signaled to the communication terminal MS in a number of parts or steps. Thus in a first step or part of the signaling message the codec mode configuration to be used with at least two codec modes could be transmitted to the communication terminal MS and in a second step or part of a signaling message the subset of a codec mode configuration to be used could be notified to the communication terminal MS. When using a codec mode, the communication terminal MS must restrict itself to the signaled subset. In this example, when data is sent in the uplink direction, the communication terminal can only use modes a and/or b. With this method it is then possible to increase significantly the probability of setting up a TrFO connection between two communication terminals MS, as the access network UTRAN with for example radio network controllers RNC can support not only codec mode configurations but also their subsets, thereby enhancing the quality of the service considerably.

Figure 3:
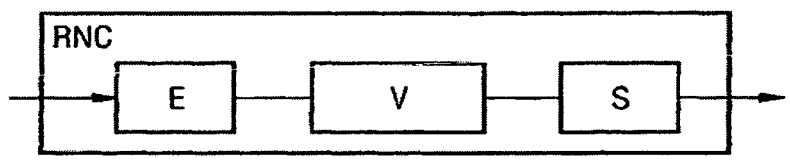
FIG. 3 is a block diagram of a device for implementing the method illustrated in FIG. 2.

FIG. 3 shows a device for implementing the method shown in FIG. 2. The device, ideally a radio network controller RNC, has a send unit (S) and a receive unit (E) for mobile communication with further network units (MS, MSC). A processing unit (V) in the radio network controller RNC is used to check a request sent from a switching unit MSC relating to the use of a subset of a codec mode configuration for the establishment of a transcoder-free operation connection between two communication terminals MS. Moreover the processing unit establishes a connection both to the requesting switching unit MSC and to the communication terminal, if the requested subset is supported. A signaling message is also sent from the processing unit (V) via the send unit (S) to the communication terminal MS relating to the subset of the codec mode configuration to be used to transmit data to the radio network controller.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for establishing a transcoder-free operation connection between two communication terminals in a communication network, comprising:
   checking in a radio network controller, upon receipt of a request from a switching unit relating to use of at one or more subsets of codec modes of at least one codec mode configuration that includes two or more codec modes for establishment of a transcoder-free operation connection, whether the one or more requested subsets are supported by the radio network controller;
   if at least one subset of the at least one codec mode configuration is supported by the radio network controller, establishing a transcoder-free operation connection to the switching unit and a communication terminal and restricting a codec mode configuration to be used for transmission of data to the subset; and
   signaling, from the radio network controller to the communication terminal, at least one message relating to the subset of the at least one codec mode configuration to be used for transmission of data.

2. The method according to claim 1, wherein at least a part of at least one message relating to the at least one codec mode configuration to be used with at least two codec modes is signaled from the radio network controller to the communication terminal for the transmission of data in an uplink direction.

3. The method according to claim 2, further comprising signaling from the radio network controller to the communication terminal at least a further part of at least one message relating to the at least one subset of the at least one codec mode configuration to be used for the transmission of data in the uplink direction.

4. The method according to claim 3, wherein the radio network controller supports all subsets of a supported codec mode configuration.

5. The method according to claim 4, wherein the transcoder-free operation connection is established from the radio network controller to the communication terminal using a codec mode configuration supported by the radio network controller.

6. The method according to claim 5, wherein the codec mode configuration represents a combination of at least two codec modes.

7. The method according to claim 6, wherein the communication network is a cellular mobile radio network.

8. The method according to claim 7, wherein a radio resource control signaling is used by the radio network controller for signaling to the communication terminal.

9. The method according to claim 8, wherein a mobile radio terminal, mobile computer and/or mobile organizer is used as the communication terminal.

10. A radio network controller for establishing a transcoder-free operation connection between two communication terminals in a communication network having a switching unit and mobile network units, comprising:

send and receive units communicating with the mobile network units; and at least one processing unit checking a request sent from the switching unit relating to use of one or more subsets of codec modes of a codec mode configuration that includes two or more codec modes for establishment of a transcoder-free operation connection to determine whether the one or more requested subsets are supported by the radio network controller, establishing a transcoder-free operation connection to the switching unit if at least one subset of the codec mode configuration is supported by said radio network controller, restricting a codec mode configuration to be used for transmission of data to the at least one subset, and signaling a message relating to the at least one subset of the codec mode configuration to be used for the transmission of data via said send unit to a communication terminal included among the mobile network units.

11. The radio network controller according to claim 10, wherein said radio network controller signals at least a part of at least one message relating to the codec mode configuration to be used with at least two codec modes for the transmission of data in an uplink direction to the communication terminal.

12. The radio network controller according to claim 11, wherein said radio network controller signals at least a further part of at least one message relating to the at least one subset of the codec mode configuration to be used for the transmission of data in the uplink direction to the communication terminal.

13. The radio network controller according to claim 12, wherein the communication network is a cellular mobile radio network.

14. The radio network controller according to claim 13, wherein the mobile network units include at least one of a mobile radio terminal, a mobile computer and a mobile organizer.

15. The radio network controller according to claim 14, wherein the codec mode configuration is a combination of at least two codec modes.

16. The method according to claim 1, wherein a Transport Combination Control Message (TCCM) is used by the radio network controller for signaling to the communication terminal.

* * * * *